US010819394B1

United States Patent
Petzel et al.

(10) Patent No.: US 10,819,394 B1
(45) Date of Patent: Oct. 27, 2020

(54) DETECTION OF NFC PROXIMITY IC CARDS (PICCS) DURING WIRELESS CHARGING

(71) Applicant: NXP B.V., Eindhoven (NL)

(72) Inventors: Leonhard Petzel, Graz (AT); Dariusz Adam Mastela, Gratkorn (AT); Harald Karl Krepelka, Graz (AT); Rainer Lutz, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/592,974

(22) Filed: Oct. 4, 2019

(51) Int. Cl.
*H04B 5/00* (2006.01)
*H02J 7/02* (2016.01)
*H04B 17/318* (2015.01)

(52) U.S. Cl.
CPC ............ *H04B 5/0037* (2013.01); *H02J 7/025* (2013.01); *H04B 17/318* (2015.01)

(58) Field of Classification Search
CPC .................................................. H04B 5/0037
See application file for complete search history.

(56) References Cited

U.S. PATENT DOCUMENTS

| 6,536,673 | B1* | 3/2003 | Kawasaki | ............ | G06K 7/0008 |
| | | | | | 235/380 |
| 2019/0028148 | A1* | 1/2019 | Louis | ................... | H04B 5/0081 |

FOREIGN PATENT DOCUMENTS

| CN | 104578219 | 4/2015 |
| CN | 105932783 | 9/2016 |
| CN | 106786888 | 5/2017 |
| CN | 106816966 | 6/2017 |
| EP | 3447875 | 2/2019 |

* cited by examiner

*Primary Examiner* — Hsinchun Liao (57) ABSTRACT

Embodiments detect the presence of proximity integrated circuit cards (PICCs) during wireless charging by analyzing the signal strength of a subcarrier within a near field communication (NFC) field. An NFC reader sends requests or other commands to stimulate a response from a PICC that may be in the operating area, and the presence of a PICC is determined based upon the signal strength for the subcarrier. For one embodiment, the subcarrier signal strength is compared to background values measured without stimulus to determine if a PICC is present in the operating area. As such, the presence of a PICC is detectable even where NFC communication with a PICC is unsuccessful because the PICC response is corrupted or not detectable due to interference. Once the presence of a PICC is determined, one or more actions can be taken to protect the PICC from damage due to wireless charging.

18 Claims, 5 Drawing Sheets

DETECTION OF NFC PROXIMITY IC CARDS (PICCS) DURING WIRELESS CHARGING

TECHNICAL FIELD

This technical field relates devices including wireless charging and near field communication (NFC).

BACKGROUND

Wireless power transfer to charge batteries within electronic devices can be achieved using inductive charging. For example, many electronic devices have power receivers that are wirelessly charged according to the Qi standard and related specifications for wireless power transfer developed by the Wireless Power Consortium. However, magnetic fields of wireless chargers can damage or destroy proximity integrated circuit cards (PICCs) also operating within electronic devices to provide near field communication (NFC). Due to this potential for damage, combined wireless charging and near field communication (NFC) systems have been developed that protect the PICC, for example, by turning off the wireless charging when presence of a PICC is detected.

There are two basic scenarios for a PICC to be present. In a first scenario, a PICC moves into the operating area together with or prior to the power receiver within the electronic device. In this first scenario, the NFC reader can typically communicate effectively with the PICC to determine its presence, and then prevent the wireless charging from damaging the PICC. In the second scenario, however, the PICC is moved into the magnetic field during wireless charging of the power receiver, and the NFC reader is often unable to determine the presence of the PICC.

Figure 1:
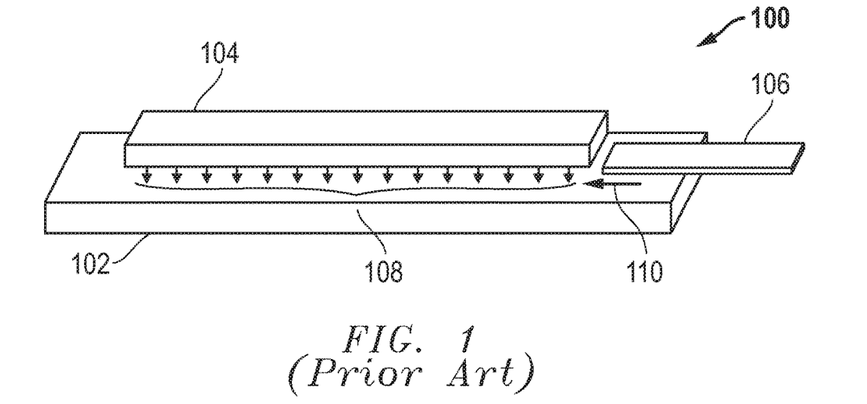
FIG. 1 (Prior Art) is a block diagram of an example embodiment where a PICC enters a wireless charging magnetic field already formed between a power receiver for an electronic device and a combined system including a wireless charger and a NFC reader.

FIG. 1 (Prior Art) is a block diagram of an example embodiment 100 for this second scenario where a PICC 106 enters a magnetic field 108 already formed between a power receiver 104 for an electronic device and a combined system 102 including a wireless charger and a NFC reader. For embodiment 100, the wireless charging is already occurring, and the magnetic field 108 has already been formed when the PICC 106 enters the operating area 108 as represented by arrow 110. For example, the PICC 106 can slide beneath the power receiver 104 and above the combined system 102. Current solutions attempt to use an NFC polling loop to detect the presence of a PICC 106 and do not accurately detect when a PICC 106 enters the operating volume during wireless power transfer due to various interference sources. It is further noted that the combined system 102 can be an integrated circuit including an NFC reader and a wireless charger as further described with respect to FIG. 3 (Prior Art).

Figure 2:
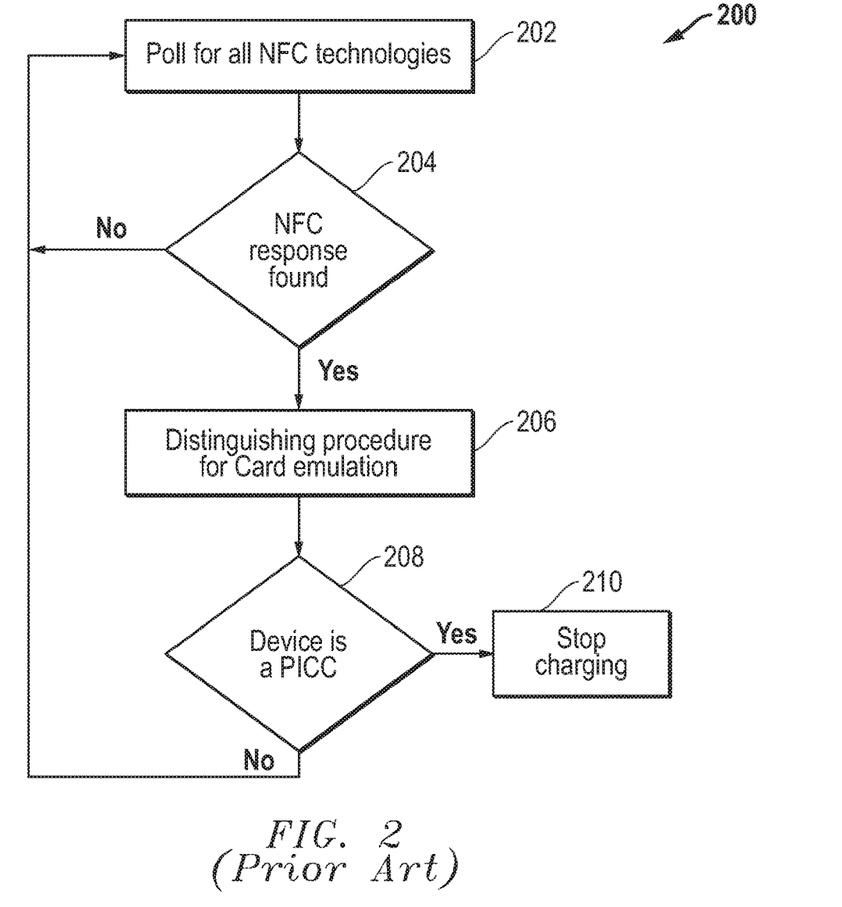
FIG. 2 (Prior Art) is a process flow diagram of an example embodiment for an NFC polling loop that attempts to detect the presence of a PICC during wireless charging.

FIG. 2 (Prior Art) is a process flow diagram of an example embodiment 200 for an NFC polling loop that attempts to detect the presence of a PICC 106 during wireless charging. In block 202, polling is periodically initiated for the NFC technologies expected to be used in the application environment. Example NFC technologies include those implemented according to the ISO 14443 standard, the ISO 15693 standard, the JIS X 6319-4 standard, or other NFC standards. In block 204, a determination is made whether an NFC response is found. If "NO," then it is assumed that no PICC 106 is not present and flow passes back to block 202. If "YES" and an NFC response is detected, then flow passes to block 206 where a distinguishing algorithm is executed that is configured to distinguish an actual PICC from an emulated PICC. In block 208, a determination is made based upon the distinguishing algorithm whether the response is from an actual PICC 106 or from a power receiver 104 that is capable of performing NFC card emulation. If "NO," then it is assumed that no PICC 106 is present and flow passes back to block 202. If "YES," then it is determined that the detected device is a PICC 106 and the charging is stopped in block 210. This polling technique of embodiment 200, however, has significant limitations and does not accurately detect a PICC 106 that moves into the magnetic field 108 after charging has already started as indicated for the second scenario above. In particular, interference between the NFC reader and the wireless charging circuitry within the system 102 can cause an inability to detect the PICC 106.

Figure 3:
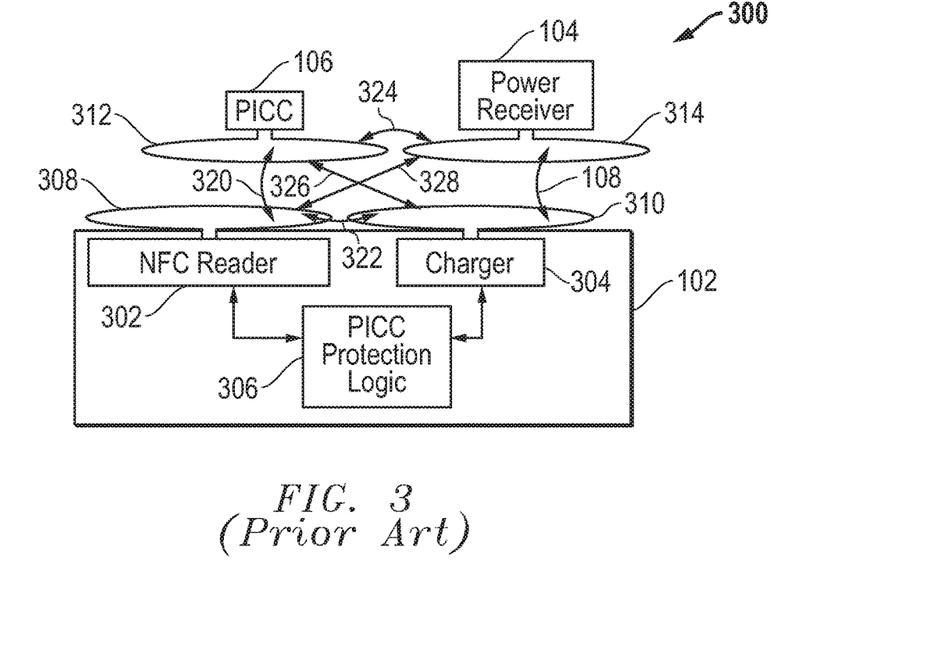
FIG. 3 (Prior Art) is a block diagram of an example embodiment where interference due to magnetic coupling impedes successful NFC communication and causes an inability to detect the PICC.

FIG. 3 (Prior Art) is a block diagram of an example embodiment 300 where interference due to magnetic coupling impedes successful NFC communication and causes an inability to detect the PICC 106. The combined system 102 includes an NFC reader 302 and a wireless charger 304, such as a wireless charger that operates according to the Qi standard. The NFC reader 302 is magnetically coupled to an antenna 308, and the wireless charger 304 is magnetically coupled to an antenna 310. The PICC 106 and a power receiver 104 are both within the magnetic field 108 generated by the wireless charger 304. The PICC 106 is coupled to an antenna 312, and the power receiver is coupled to an antenna 314. Each of the antennas 308/310/312/314 can be a loop antenna, although other antenna structures can also be used. The combined system 102 also includes PICC protection circuit 306 that attempts to protect the PICC 106 from damage caused by wireless charging. This PICC protection circuit 306 in part links the operation of the wireless charger 304 with information from the NFC reader 302 concerning the presence of a PICC 106.

For NFC communications, transmit circuitry within the NFC reader 302 creates an NFC field 320, and the PICC 106 responds by modulating an answer on the NFC field 320. The communication interface between the NFC reader 302 and the PICC 106 is established over the magnetic coupling between the antennas 308 and 312 represented by the NFC field 320. Receive circuitry for the NFC reader 302 within the combined system 102 is responsible for decoding the answer from the PICC 106.

For wireless charging operations, a power transmitter within the wireless charger 304 generates a magnetic field 108, and the power receiver 104 draws power from the charging magnetic field 108. The power transfer from the charging magnetic field 108 occurs through magnetic coupling that is formed between the antennas 310 and 314. In addition to this desired magnetic coupling, however, additional parasitic and undesirable magnetic coupling occurs between the antennas 308 and 310 as indicated by field 322, between antennas 312 and 314 as indicated by field 324, between antennas 310 and 312 as indicated by field 326, and between antennas 308 and 314 as indicated by field 328.

The parasitic coupling fields 322, 324, 326, and 328 can degrade NFC communications and damage components. The coupling field 322 between the antenna 310 for the wireless charger 304 and the antenna 308 for the NFC reader 302 can cause the NFC reader 302 to be unable to decode responses from the PICC 106. The coupling field 326 between the antenna 310 for the wireless charger 304 and the antenna 312 for the PICC 106 can cause damage to the PICC 106. This coupling field 326 can also cause errors in clock generation performed by the PICC 106 and lead to malformed responses from the PICC 106. The coupling field 328 between the NFC reader 302 and the power receiver 104 can lead to distortions in NFC modulations used for NFC communications, such as modulations on subcarriers. For example, as the power receiver 104 is typically non-linear, distortions similar to NFC load modulations can be introduced on the NFC carrier or subcarrier by the parasitic coupling field of the charger 326. Other system degradation can also occur due to these parasitic coupling fields 322, 324, 326, and 328.

One counter-measure that has been applied to avoid NFC interference due to the coupling field 322 between the antenna 308 and the antenna 310 is to decouple the NFC reader antenna 308 and the wireless transmitter antenna 310 through antenna design for the combined system 102. However, this decoupling solution is difficult to achieve with multi-coil wireless charging solutions for the wireless charger 304. Further, the other parasitic coupling fields 324/326/328 depend on physical positioning of the PICC 106 with respect to the power receiver 104, which typically changes over time. As such, interference from these coupling fields 324/326/328 cannot effectively be eliminated by antenna design.

Antenna design also does not counteract non-linear elements that distort the NFC field 320 used for communication between the PICC 106 and the NFC reader 302. Mainly because of voltage limiting circuits on the PICC 106, the behavior of the PICC 106 is non-linear. The effect of the non-linearity is different depending upon whether the NFC field 320 and the wireless charging field 108 add constructively or destructively in causing distortions on the NFC field 320. The NFC reader 320 can erroneously decode these distortions as modulations from the PICC 106. The PICC 106 is typically configured to communicate by changing its impedance and thereby modulate the NFC field 320. It is noted that non-linear elements within the power receiver 104 include, for example, limiters, rectifiers, or other non-linear circuits.

In addition to malformed or non-detectable responses from the PICC 106 when exposed to charging magnetic field 108, the clock generation with the PICC 106 can also fail due to the magnetic field 108. This clock generation failure can cause timings that do not comply with specifications for wireless charging protocols. In combination with malformed responses, this clock generation failure can make normal NFC communication impossible during wireless charging.

Figure 4:
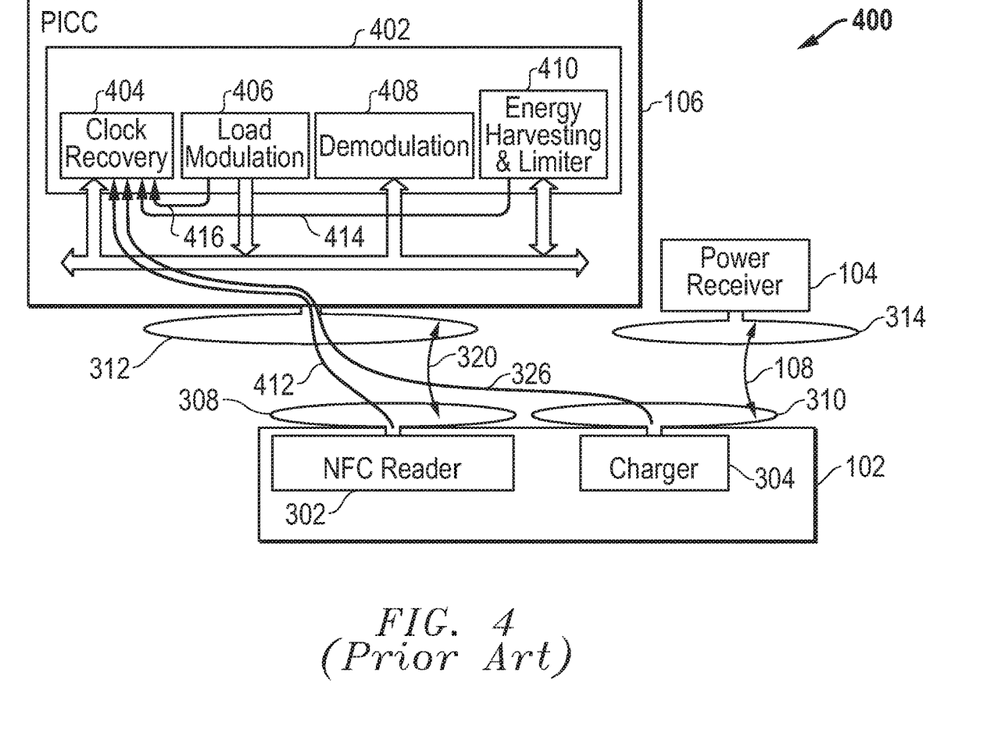
FIG. 4 (Prior Art) is a block diagram of an example embodiment where a wireless charging magnetic field causes clock generation failures for NFC communications.

FIG. 4 (Prior Art) is a block diagram of an example embodiment 400 where a wireless charging magnetic field 108 causes clock generation failures for NFC communications. As described above, the antenna 312 for the PICC 106 couples with the antenna 310 for the wireless charger 304. This coupling can cause failure for clock generation within the PICC 106. For example, this coupling can cause distortions within analog circuits 402 within the PICC 106. These analog circuits can include, for example, clock recovery circuit 404, load modulation circuit 406, demodulation circuit 408, and energy harvesting and limiter circuits 410.

For normal NFC communications, clock recovery occurs through magnetic coupling and related modulations from the antenna 308 for the NFC reader 302 and the antenna 312 for the PICC 106. This clock recovery path is represented by arrow 402 from the NFC reader 302 to the clock recovery circuit 404. Coupling field 326 between the antenna 310 and the antenna 312 as well as distortions 414 and 416 from other analog circuits can cause malfunction of the clock recovery circuit 404. One critical time for accurate clock recovery is during the response of the PICC 106 to initial requests generated by the NFC reader 302 through NFC field 320. For example, when the noise level is high, there is a risk that clock generation circuitry within the clock recovery circuit 404, such as phase-lock-loop (PLL) circuitry, will become asynchronous to the NFC carrier during the time of load modulation. In that case, the PICC 106 may respond, but this response will likely be invalid. As such, the NFC reader 302 will not be able to detect the response or the presence of the PICC 106, and the PICC 106 can be damaged by the wireless charging.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Embodiments are disclosed that protect PICCs during wireless charging by demodulating and analyzing the signal strength of a subcarrier within the NFC field. The strength of these subcarrier signals are compared to background values to determine whether a PICC is present. Actions can then be taken to protect the PICC. A variety of additional or different features and variations can also be implemented.

As described above, prior solutions relied upon correct decoding of NFC responses from PICCs to NFC requests initiated by an NFC reader to detect the presence of a PICC. Once detected, the combined system could take action to protect the PICC during wireless charging. As described above, however, different parasitic coupling fields and related interference due to wireless charging can cause detection of these NFC responses to be unreliable or not possible.

The disclosed embodiments provide a solution by allowing PICCs to be detected where responses to NFC requests are corrupted or not detectable. As described herein, the NFC reader sends requests or other commands to stimulate a response from a PICC that may be in the operating area during wireless charging. However, rather than decoding the response to determine the presence of a PICC, the disclosed embodiments determine the presence of a PICC based upon the signal strength for a subcarrier within the NFC field. The subcarrier signal strength is then compared to background values measured without stimulus to determine if a PICC is present in the operating area. As such, the disclosed embodiments are able to detect the presence of a PICC even where communication with a PICC is unsuccessful, for example, because the PICC response is corrupted or not detectable due to interference. Once the presence of a PICC is determined from the subcarrier signal strength determinations, one or more actions can be taken to protect the PICC from damage due to wireless charging. Other variations can also be implemented while still taking advantage of the techniques described herein.

Figure 5:
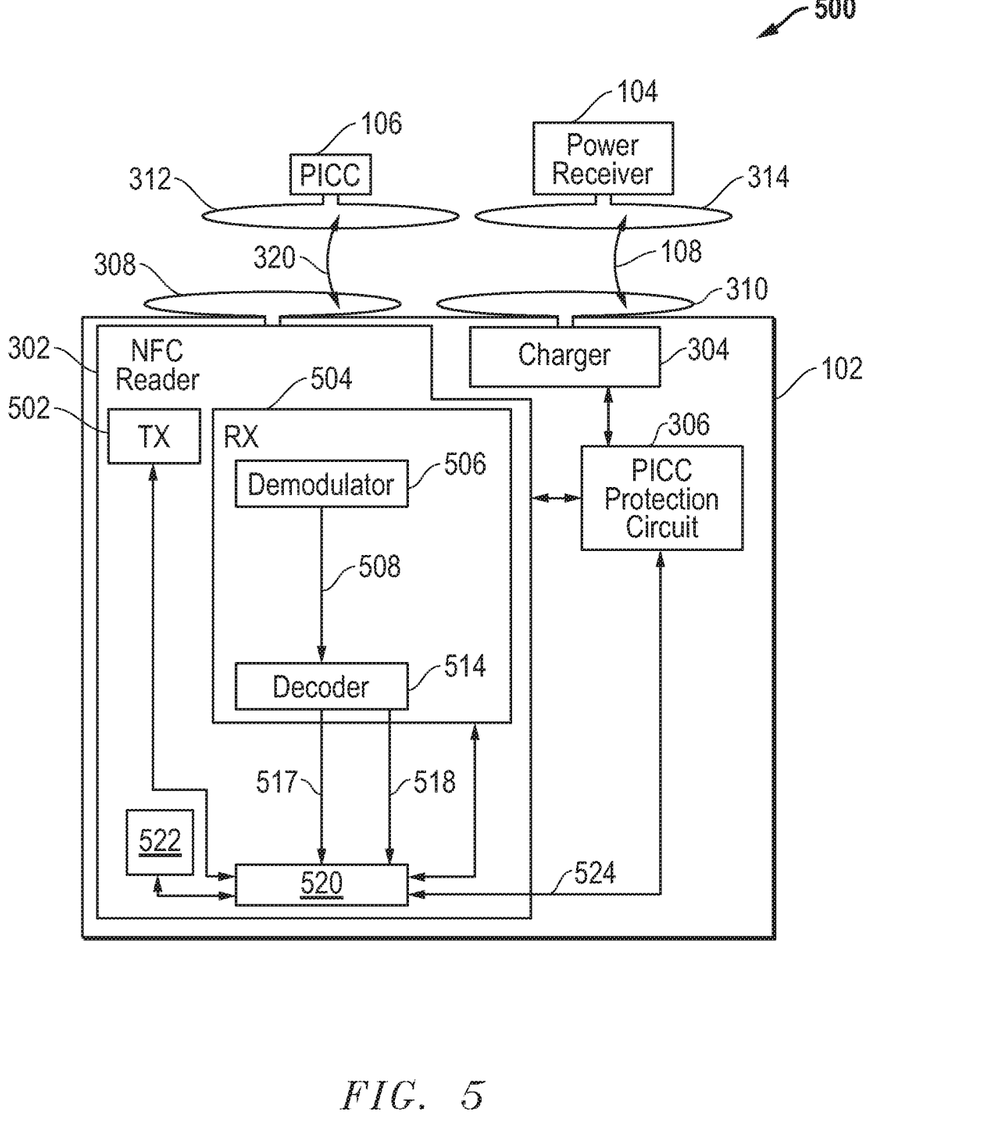
FIG. 5 is a block diagram of an example embodiment where subcarrier signals are used to determine the presence of a PICC within a wireless charging magnetic field formed between a wireless charger and a power receiver.

FIG. 5 is a block diagram of an example embodiment 500 where subcarrier signals are used to determine the presence of a PICC 106 within a magnetic field 108 formed between a charger 304 and a power receiver 104. The combined system 102 includes an NFC reader 302 and the charger 304, and the combined system 102 is included within an integrated circuit. The NFC reader 302 includes transmit (TX) circuitry 502 and receive (RX) circuitry 504. The receive circuitry 504 includes a demodulator 506 that provide a demodulated signal 508 to the decoder 514. The decoder 514 outputs a decoded subcarrier signal 517 and a subcarrier-detected signal 518 to a controller 520. The controller 520 receives these signals 517/518 and outputs a PICC detection signal 524 to PICC protection circuit 306. The PICC protection circuit 306 communicates with the wireless charger 304 to cause actions to be taken to protect the PICC 106 during wireless charging based upon the PICC detection signal 524. For example, wireless charging can be turn off if a PICC 106 is detected.

During operation, the demodulator 506 receives and demodulates radio frequency (RF) signals within the NFC field 320 and outputs a demodulated signal 508, such as a baseband signal that can be a subcarrier. For one example embodiment, the demodulator 506 can be a quadrature demodulator that outputs baseband real (I) and imaginary (Q) quadrature signals, which are combined to provide the demodulated signal 508. A decoder 514 receives the demodulated signal 508 and checks for the presence of a valid subcarrier. The decoder 514 outputs the subcarrier-detected signal 518 to indicate whether a valid subcarrier was detected. If a valid subcarrier is detected, the decoder 514 decodes the demodulated signal 508 into a decoded subcarrier signal 517. For one example embodiment, the decoder 514 can be a digital synchronization circuit that generates a bit stream as the decoded subcarrier signal 517 and also generates a digital signal as the subcarrier-detected signal 518. Other output signals and variations can also be implemented.

For NFC communications, the NFC reader 302 uses the transmit circuitry 502 to initiate an NFC request through the NFC field 320. The PICC 106 generates a response by modulating an answer on the NFC field 320 using an intermediate subcarrier. The receive (RX) circuitry 504 within the combined system 102 receives, demodulates, and decodes the answer. Further NFC communications then occur through modulations of the magnetic coupling between the antennas 308 and 312 as represented by the NFC field 320.

As described above, however, parasitic magnetic coupling caused by the wireless charging from wireless charger 304 can degrade the NFC communications such that valid communications between the NFC reader 302 and the PICC 106 are corrupted or are not possible. For example, the parasitic coupling can cause noise to be detected and output by the demodulator 506 in the receive circuitry 504 even without a response by the PICC 106. This false detection can cause the decoder 514 to output a decoded subcarrier signal 517 for NFC communication packets even though a PICC 106 is not present. Further, for prior solutions as described above, this noise can cause responses from the PICC 106 to be non-detectable such that the NFC reader 302 will be unable to determine that a PICC 106 is present.

The disclosed embodiments solve this problem by relying upon the strength of subcarrier signals to detect the presence of the PICC 106. As described in more detail below, the NFC reader 302 issues one or more stimulus signals in form of NFC requests. For example, the NFC reader 302 can send NFC requests for one or more NFC protocols that could be used by a PICC 106 in the application environment. After NFC requests are sent for a particularly NFC protocol, the NFC reader 302 scans the NFC field 320 for subcarrier signals. The NFC reader 302 then uses the subcarrier signal strength to determine the presence of a PICC 106 rather than relying upon the ability to decode an answer to the NFC request received from a PICC 106. For example, if the signal strength for detected subcarrier signals with the stimulus is significantly stronger than the background subcarrier level detected without a stimulus, a PICC 106 can be deemed to be present. For one embodiment, the difference between a current subcarrier signal strength with stimulus and a background subcarrier signal strength without stimulus is compared to a threshold, and a PICC 106 is deemed to be present if the threshold is exceeded. A PICC detection signal 524 can then be output to the PICC protection circuit 306 indicating the presence of a PICC 106 within the operating area. The PICC protection circuit 306 can then take action to protect the PICC 106.

It is noted that the disclosed embodiments can be used with various NFC communication standards including the ISO 14443 standard, the ISO 15693 standard, the JIS X 6319-4 standard, or other NFC standards. These NFC standards provide for an NFC request to be initiated by the NFC reader 302. For example, ISO 14443-3 within the ISO 14443 standard provides for a REQA (Request A) or a REQB (Request B) that are initiated to request a response from a PICC 106. The PICC 106 responds with an ATQA (Answer to Request A) or with an ATQB (Answer to Request B), respectively. JIS X 6319-4 provides for a REQ (Request) that is initiated to request a response from a PICC 106. The PICC 106 responds with an ATQ (Request Response).

For one embodiment, the controller 520 executes firmware or other program instructions stored in memory 522 to carry out the detection functions described herein. The memory 522 can be one or more non-transitory data storage mediums that store the firmware or program instructions that when executed by the controller 520 causes the functions described herein to be performed. For one embodiment, PICC protection circuit 306 is implemented as hardware logic circuits that operate to cause actions that protect the PICC 106 during wireless charging as described herein. For one embodiment, the PICC protection circuit 306 is implemented as a processor that executes firmware or other program instructions stored in one or more non-transitory data storage mediums to carry out the PICC protection functions described herein. It is further noted that controller 520 can be a microcontroller, a microprocessor, a programmable logic device, or other programmable circuit that executes program instructions stored in a non-volatile data storage device to carry out the functions described herein.

PICC protection circuit 306 can be implemented as a dedicated logic circuit, dedicated controller, or other hardware digital solution that implements the control actions and functions described herein. The PICC protection circuit 306 can also be implemented as a microcontroller, a microprocessor, a programmable logic device, or other programmable circuit that executes program instructions stored in a non-volatile data storage device to carry out the control actions and functions described herein. Other variations can also be implemented.

Figure 6:
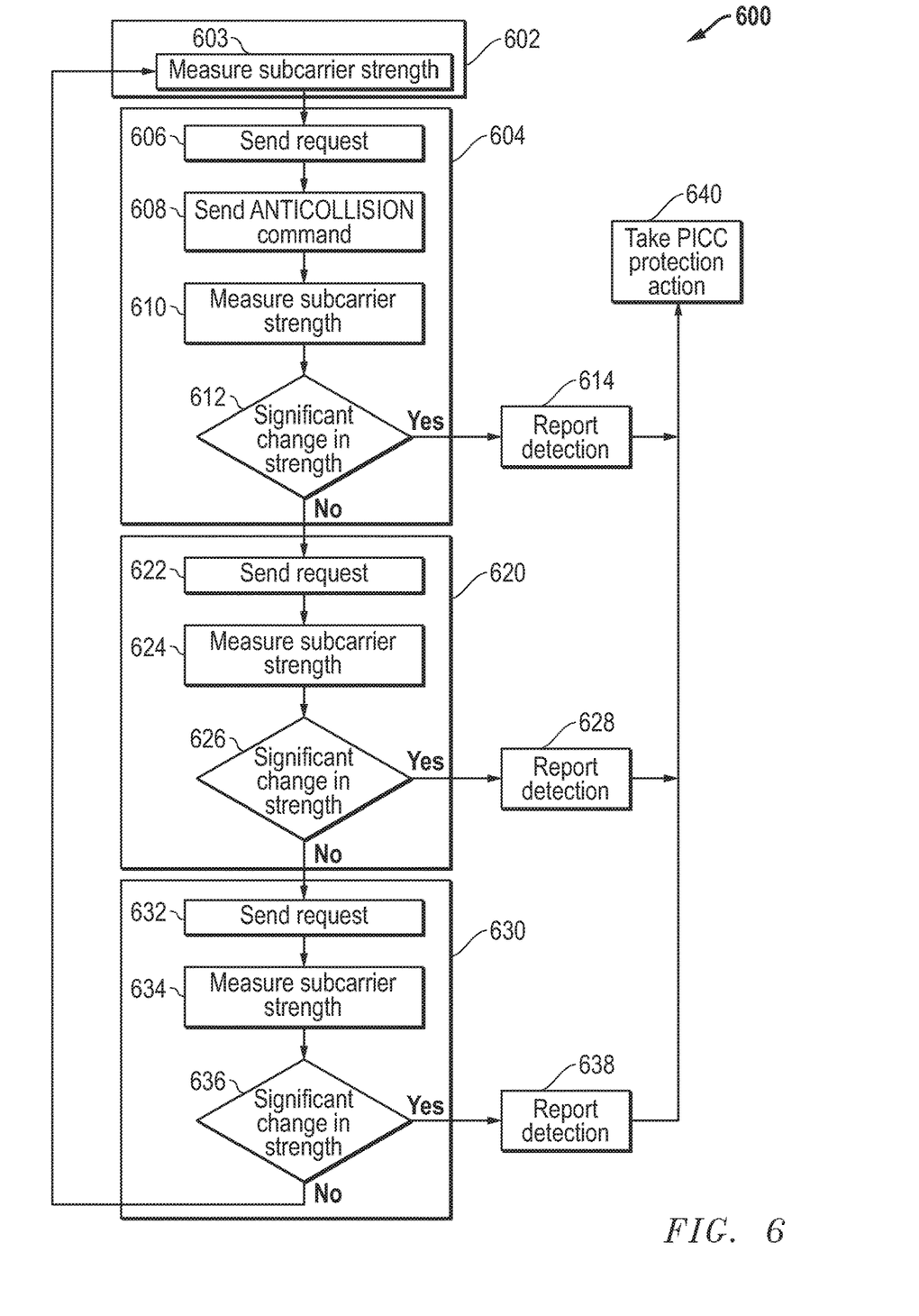
FIG. 6 is a process flow diagram of an example embodiment where subcarrier signal strength is detected for different NFC protocols to determine the presence of a PICC.

FIG. 6 is a process flow diagram of an example embodiment 600 where subcarrier signal strength is detected for different NFC protocols. In the calibration stage 602, the subcarrier strength is measured in block 603 to determine a background value for the subcarrier signal strength. For this measurement, the background subcarrier signal strength is determined without any stimulation by the NFC reader 302 or modulation by a PICC 106. The resulting measurement provides a reference value for later comparisons and detection determinations. Because of the wireless charging magnetic field 108, which also contains higher frequency components and non-linear elements as described above, a certain noise floor is detected even though no PICC device is deliberately modulating the NFC field 320. This noise floor causes the detection of the background signal for the subcarrier.

Different detections stages 604, 620, and 630 follow the calibration stage 602. Although three detection stages are shown, it is understood that one or more stages can be used depending upon the NFC protocols expected to be used in an application environment for the disclosed embodiments. For embodiment 600, the detection stage 604 is configured for ISO 14443-A; the detection stage 620 is configured for ISO 14443-B; and the detection stage 630 is configured for JIS X 6319-4 (Felicia).

Detection stage 604 for ISO 14443-A begins with a request (REQA) being issued by the NFC reader 302 in block 606. In block 608, the NFC reader 302 also issues an ANTICOLLISION command. Once the PICC 106 receives the ANTICOLLISION command, it continues with a UID (user identification) response. As the answer (ATQA) to the REQA command is only about 150 microseconds long, the first cascade level of the UID response is used for assessing the sub carrier strength. After sending the ANTICOLLISION command, therefore, the NFC receiver is activated to measure the subcarrier strength in block 610. In block 612, a determination is made whether a significant change has occurred in subcarrier signal strength from a comparison of the current subcarrier signal strength to the background value for the subcarrier signal strength. For one embodiment, the difference between the current signal strength and the background signal strength is compared to a threshold, and a PICC 106 is deemed to be present if the threshold is exceeded. If the determination is "NO," then the next detection stage 620 is reached. If the determination is "YES," then detection of a PICC 106 is reported in block 614, and a protection action is taken in block 640 to protect the PICC 106. For example, wireless charging by the wireless charger 304 can be turned off. Other actions can also be taken.

Detection stage 620 for ISO 14443-B begins with a request (REQB) being sent by the NFC reader 302 in block 622. The answer (ATQB) to the REQB is long enough to use for assessing if a PICC 106 is responding. After the maximum response delay time (TR0) defined in ISO14443-2, the NFC reader 302 measures the subcarrier strength in block 624. In block 626, a determination is made whether a significant change has occurred in subcarrier signal strength from a comparison of the current subcarrier signal strength to the background value for the subcarrier signal strength. For one embodiment, the difference between the current signal strength and the background signal strength is compared to a threshold, and a PICC 106 is deemed to be present if the threshold is exceeded. If the determination is "NO," then the next detection stage 630 is reached. If the determination is "YES," then detection of a PICC 106 is reported in block 628, and a protection action is taken in block 640 to protect the PICC 106. For example, wireless charging by the wireless charger 304 can be turned off. Other actions can also be taken.

Detection stage 630 for JIS X 6319-4 begins with a request (REQ) being sent by the NFC reader 302 in block 632. Although this standard does contemplate subcarriers, the same detection strategy can be used as an answer (ATQ) is sent by a PICC 106 according to JIS X 6319-4 in response to the request (REQ). In block 634, the current subcarrier signal strength is measured by the receiver circuitry 504 for the NFC reader 302. In block 636, a determination is made whether a significant change has occurred in subcarrier signal strength from a comparison of the current subcarrier signal strength to the background value for the subcarrier signal strength. For one embodiment, the difference between the current signal strength and the background signal strength is compared to a threshold, and a PICC 106 is deemed to be present if the threshold is exceeded. If the determination is "NO," then the process returns to block 603 within the calibration stage 602. If the determination is "YES," then detection of a PICC 106 is reported in block 638, and a protection action is taken in block 640 to protect the PICC 106. For example, wireless charging by the wireless charger 304 can be turned off. Other actions can also be taken.

It is again noted additional or fewer detection stages could be used prior to returning to calibration stage 602 depending upon the NFC protocols possibly being used by a PICC 106 for a particular application environment. Further, additional or different stages could also be used in embodiment 600 while still taking advantage of the techniques described herein. For example, where the power receiver 104 includes an emulated PICC that can potentially respond to NFC requests sent by the NFC reader 302, a HALT command can be issued by the combined system 102 to the power receiver 104 prior to running the algorithm of embodiment 600. The HALT command puts the emulated PICC in the power receiver 104 in a HALT state so that it does not respond to the NFC requests in embodiment 600. Other variations could also be implemented.

For the embodiments described herein, subcarrier signal strength measurements may be implemented using different techniques. One technique is to measure the subcarrier signal strength with binary measurements and a high time resolution. The signal strength is then defined as the rate of positive measurements during the response time. This approach can be implemented with the subcarrier-detected signal 518 generated by the decoder 514. For example, the subcarrier-detected signal 518 from the decoder 514 can be sampled over a time period by the controller 520 to generate an indication of the current subcarrier signal strength based upon the number of positive identifications for subcarrier detection during that time period. The controller 520 can then compare this current subcarrier signal strength to a background subcarrier signal strength that was generated from samples taken when stimulus of PICCs was not provided by the NFC reader 302.

One additional technique is to measure the signal strength by averaging (e.g., root-mean-square) the signal strength of the demodulated signal 508 output by the demodulator 506 over a certain time period. Other techniques could also be used.

Figure 7:
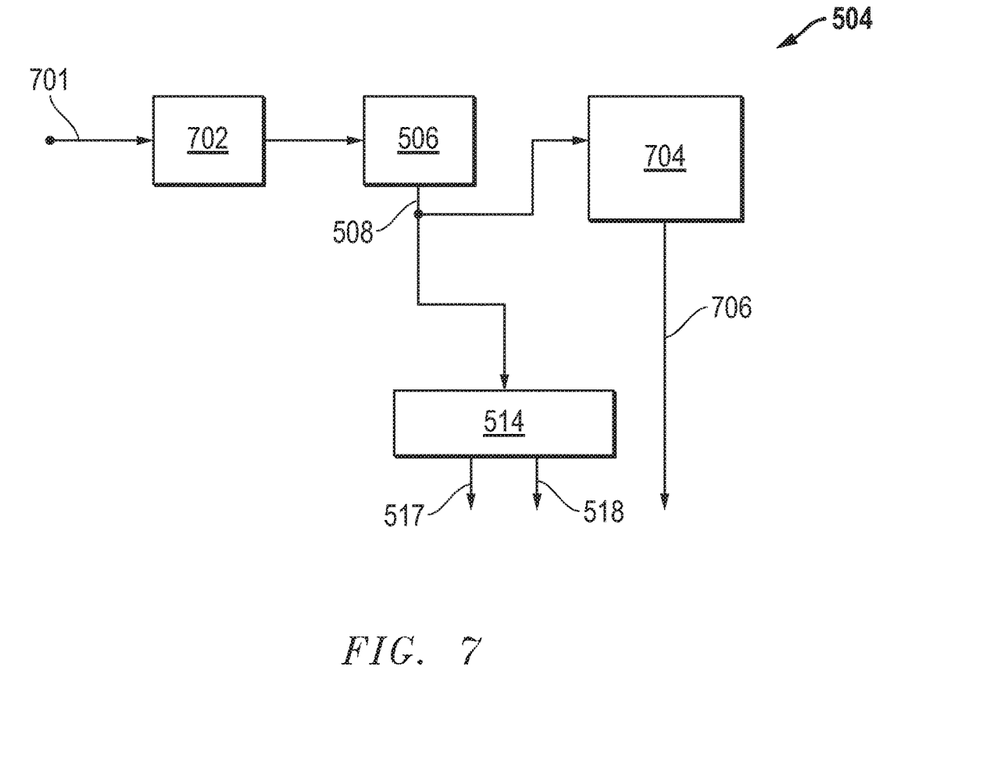
FIG. 7 is a block diagram of an example embodiment for receive circuitry that includes a receive signal strength (RSS) detector for the subcarrier signal strength.

FIG. 7 is a block diagram of an example embodiment for receive circuitry 504 that includes a receive signal strength (RSS) detector 704. RF input signals 701 from the NFC field 320 are received by an RF front end (RFFE) 702 through the antenna 308. The RFFE 702 can include analog circuits such as filters, mixers, automatic gain control circuits, or other circuits. The output of the RFFE 702 is received by the demodulator 506. As described above, the demodulated signal 508 output by the demodulator 506 is provided to the decoder 514. The decoder generates the decoded subcarrier signal 517 and the subcarrier-detected signal 518. For the example embodiment of FIG. 7, the demodulated signal 508 output by the demodulator 506 is also provided to the RSS detector 704. The RSS detector 704 generates an RSS output 706 representing the signal strength of the demodulated signal 508, and this RSS output 706 is used to represent the subcarrier signal strength. For example, the RSS detector 704 can generate the RSS output 706 by sampling and averaging (e.g., root-mean-square) the signal strength of the demodulated signal 508 measured over a selected time period, and this resulting RSS output 706 is used to represent the subcarrier signal strength.

The RSS output 706 is provided to the controller 520, and the controller 520 uses this RSS output 706 to determine whether a PICC 106 is present based upon changes in the subcarrier signal strength. It is again noted that the determination of a significant change in signal strength for the subcarrier can be implemented using different techniques. As indicated above, one technique compares the difference of the current subcarrier signal strength and the background subcarrier signal strength to a threshold value. If the difference exceeds the threshold, then a PICC detection can be indicated by the PICC detection signal 524. Further, the threshold value can be adapted dynamically during operation of the combined system 102. Other variations could also be implemented.

Figure 8:
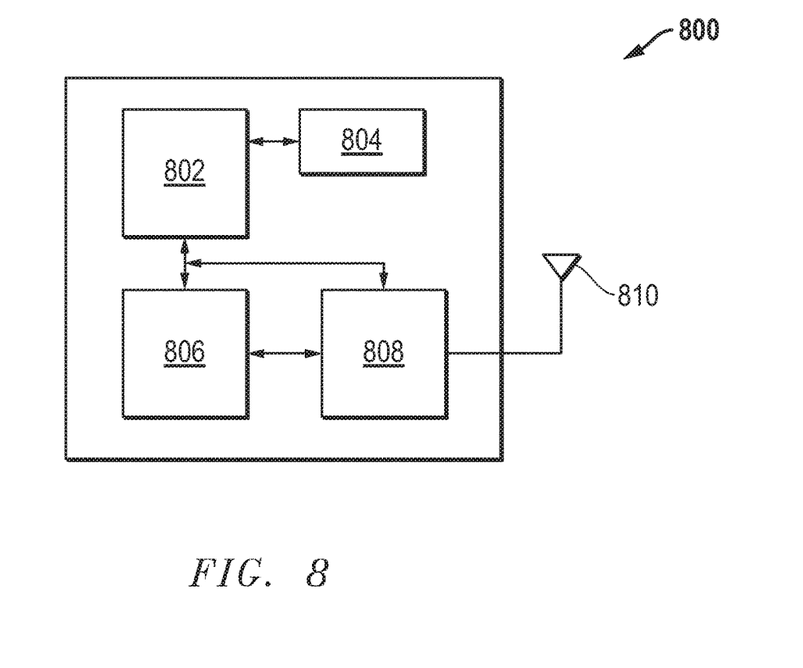
FIG. 8 is a block diagram of an example embodiment for a device that can operate as the PICC or the power receiver.

FIG. 8 is a block diagram of an example embodiment for a device 800 that can operate as the PICC 106 or the power receiver 104. The device 800 includes a programmable integrated circuit 802 and an associated memory 804. The device 800 also includes receive/transmit circuitry 806 and interface circuitry 808, which is coupled to antenna 810. The receive/transmit circuitry 806 and the interface circuitry 808 are configured to operate according to one or more wireless charging standards, such as the Qi standard for wireless power transfer developed by the Wireless Power Consortium, or one or more NFC communication standards, such as the ISO 14443 standard, the ISO 15693, or the JIS X 6319-4 standard. The programmable integrated circuit 802 can be a microprocessor, embedded processor, an application specific circuit, a programmable circuit, a microcontroller, or other programmable integrated circuit. This memory 804 contains instructions, which, when executed by the programmable integrated circuit, enable the device 800 to perform the functions described herein. This memory 804 may be a non-volatile memory, such as a FLASH ROM, an electrically erasable ROM, or other suitable devices. In other embodiments, the memory 804 may be a volatile memory, such as a RAM or DRAM. It is further noted that some or all of these components for device 8002 may be integrated into a single electronic component rather than being separate components. Other variations can also be implemented.

As described herein, a variety of embodiments can be implemented and different features and variations can be implemented, as desired.

For one embodiment, a method for combined wireless charging and near field communications (NFC) is disclosed including generating, with a wireless charger, a magnetic field for wireless charging; generating, with an NFC reader, an NFC field; measuring signal strength for a subcarrier signal associated with the NFC field; determining presence of a proximity integrated circuit card (PICC) based upon the signal strength of the subcarrier signal; and performing at least one action to protect the PICC if the PICC is determined to be present. In further embodiments, the performing includes turning off the wireless charging.

In additional embodiments, the method includes issuing, with the NFC reader, a request through the NFC field to obtain a response from the PICC when present. In further embodiments, the method includes issuing, with the NFC reader, one or more additional commands from the NFC reader through the NFC field. In further embodiments, the method includes issuing, with the wireless charger, one or more commands to a power receiver prior to the issuing of the request. In further embodiments, the NFC reader is configured to operate in a plurality of different NFC protocols, and the method also includes issuing requests for each NFC protocol.

In additional embodiments, the method includes, with the NFC reader, demodulating a radio frequency signal from the NFC field to output a demodulated signal and decoding the demodulated signal to output a decoded subcarrier signal and a subcarrier-detected signal. In further embodiments, the method includes sampling the subcarrier-detected signal to generate a current subcarrier signal strength and determining presence of the PICC by comparing the current subcarrier signal strength to a background subcarrier signal strength.

In additional embodiments, the method includes, with the NFC reader, demodulating a radio frequency signal from the NFC field to output a demodulated signal and measuring the current subcarrier signal strength by sampling and averaging the demodulated signal to generate a receive signal strength (RSS) output. In further embodiments, the method includes determining presence of the PICC by comparing the RSS output to a background subcarrier signal strength.

For one embodiments, a system having combined wireless charging and near field communications (NFC) is disclosed including a wireless charger configured to generate a magnetic field for wireless charging, an NFC reader configured to communicate through an NFC field with a proximity integrated circuit card (PICC) and to determine presence of the PICC based upon signal strength for a subcarrier signal associated with the NFC field and generated during the wireless charging, and a protection circuit programmed to perform at least one action to protect the PICC if the NFC reader determines presence of the PICC during wireless charging by the wireless charger. In further embodiments, the at least one action includes turning off wireless charging by the wireless charger.

In additional embodiments, the NFC reader is configured to issue a request through the NFC field to obtain a response from the PICC when present. In further embodiments, one or more additional commands are issued by the NFC reader through the NFC field. In further embodiments, the wireless charger is configured to issue one or more commands to a power receiver prior to the request being issued by the NFC reader. In further embodiments, the NFC reader is configured to operate in a plurality of different NFC protocols, and requests for each NFC protocol are issued using the NFC field.

In additional embodiments, the NFC reader includes a demodulator coupled to receive a radio frequency signal from the NFC field and having a demodulated signal as an output, a decoder having the demodulated signal as an input and having a decoded subcarrier signal and a subcarrier-detected signal as outputs, and a controller coupled to receive the decoded subcarrier signal and the subcarrier-detected signal. In further embodiments, the controller has a PICC detection signal as an output to the protection circuit, and the PICC detection signal indicates presence of the PICC based upon sampling of the subcarrier-detected signal from the decoder to generate a current subcarrier signal strength and a comparison of the current subcarrier signal strength to a background subcarrier signal strength.

In additional embodiments, the NFC reader includes a demodulator coupled to receive a radio frequency signal from the NFC field and having a demodulated signal as an output and includes a receive signal strength (RSS) detector coupled to receive the demodulated signal from the demodulator and having an RSS output representing the current subcarrier signal strength. In further embodiments, the system includes a controller coupled to receive the RSS output and having a PICC detection signal as an output to the protection circuit, and the PICC detection signal indicates presence of the PICC based upon a comparison of the RSS output to a background subcarrier signal strength.

It is further noted that the functional blocks, components, systems, devices, or circuitry described herein can be implemented using hardware, software, or a combination of hardware and software along with analog circuitry as needed. For example, the disclosed embodiments can be implemented using one or more programmed integrated circuits that are programmed to perform the functions, tasks, methods, actions, or other operational features described herein for the disclosed embodiments. The one or more programmed integrated circuits can include, for example, one or more processors or configurable logic devices (CLDs) or a combination thereof. The one or more processors can be, for example, one or more central processing units (CPUs), controllers, microcontrollers, microprocessors, hardware accelerators, ASICs (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the programmed integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The programmed integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations.

Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for combined wireless charging and near field communications (NFC), comprising:
   generating, with a wireless charger, a magnetic field for wireless charging;
   generating, with an NFC reader, an NFC field;
   measuring signal strength for a subcarrier signal associated with the NFC field;
   determining presence of a proximity integrated circuit card (PICC) based upon the signal strength of the subcarrier signal;
   performing at least one action to protect the PICC if the PICC is determined to be present, and
   issuing, with the NFC reader, a request through the NFC field to obtain a response from the PICC when present.

2. The method of claim 1, wherein the performing comprises turning off the wireless charging.

3. The method of claim 1, further comprising issuing, with the NFC reader, one or more additional commands from the NFC reader through the NFC field.

4. The method of claim 1, further comprising issuing, with the wireless charger, one or more commands to a power receiver prior to the issuing of the request.

5. The method of claim 1, wherein the NFC reader is configured to operate in a plurality of different NFC protocols, and further comprising issuing requests for each NFC protocol.

6. The method of claim 1, further comprising, with the NFC reader:
   demodulating a radio frequency signal from the NFC field to output a demodulated signal; and
   decoding the demodulated signal to output a decoded subcarrier signal and a subcarrier-detected signal.

7. The method of claim 6, further comprising sampling the subcarrier-detected signal to generate a current subcarrier signal strength, and determining presence of the PICC by comparing the current subcarrier signal strength to a background subcarrier signal strength.

8. The method of claim 1, further comprising, with the NFC reader:
   demodulating a radio frequency signal from the NFC field to output a demodulated signal; and
   measuring the current subcarrier signal strength by sampling and averaging the demodulated signal to generate a receive signal strength (RSS) output.

9. The method of claim 8, further comprising determining presence of the PICC by comparing the RSS output to a background subcarrier signal strength.

10. A system having combined wireless charging and near field communications (NFC), comprising:
   a wireless charger configured to generate a magnetic field for wireless charging;
   an NFC reader configured to communicate through an NFC field with a proximity integrated circuit card (PICC) and to determine presence of the PICC based upon signal strength for a subcarrier signal associated with the NFC field and generated during the wireless charging, the NFC reader comprising
      a demodulator coupled to receive a radio frequency signal from the NFC field and having a demodulated signal as an output; and
      a receive signal strength (RSS) detector coupled to receive the demodulated signal from the demodulator and having an RSS output representing the current subcarrier signal strength; and
   a protection circuit programmed to perform at least one action to protect the PICC if the NFC reader determines presence of the PICC during wireless charging by the wireless charger.

11. The system of claim 10, wherein the at least one action comprises turning off wireless charging by the wireless charger.

12. The system of claim 10, wherein the NFC reader is configured to issue a request through the NFC field to obtain a response from the PICC when present.

13. The system of claim 12, wherein one or more additional commands are issued by the NFC reader through the NFC field.

14. The system of claim 12, wherein the wireless charger is configured to issue one or more commands to a power receiver prior to the request being issued by the NFC reader.

15. The system of claim 12, wherein the NFC reader is configured to operate in a plurality of different NFC protocols, and wherein requests for each NFC protocol are issued using the NFC field.

16. The system of claim 10, wherein the NFC reader comprises:
   a demodulator coupled to receive a radio frequency signal from the NFC field and having a demodulated signal as an output; and
   a decoder having the demodulated signal as an input and having a decoded subcarrier signal and a subcarrier-detected signal as outputs; and
   a controller coupled to receive the decoded subcarrier signal and the subcarrier-detected signal.

17. The system of claim 16, wherein the controller has a PICC detection signal as an output to the protection circuit, the PICC detection signal indicating presence of the PICC based upon sampling of the subcarrier-detected signal from the decoder to generate a current subcarrier signal strength and a comparison of the current subcarrier signal strength to a background subcarrier signal strength.

18. The system of claim 10 further comprising a controller coupled to receive the RSS output and having a PICC detection signal as an output to the protection circuit, the PICC detection signal indicating presence of the PICC based upon a comparison of the RSS output to a background subcarrier signal strength.

* * * * *